United States Patent Office 3,657,263
Patented Apr. 18, 1972

3,657,263
CERTAIN BENZISOTHIAZOLE-ACETIC
ACID DERIVATIVES
Tullo Vitali, Parma, Pietro Scrivani, Milan, Riccardo Ponci, Pavia, Giovanni Pellegrini, Milan, Franco Gialdi, Pavia, and Emilio Arsura, San Donato, Milan, Italy, assignors to Montecatini Edison S.p.A., Milan, Italy, and Franco Gialdi, Riccardo Ponci, and Tullo Vitali, fractional part interest to each
No Drawing. Filed Oct. 6, 1969, Ser. No. 866,089
Claims priority, application Italy, Oct. 7, 1968, 22,169/68
Int. Cl. C07d 91/12
U.S. Cl. 260—304
25 Claims

ABSTRACT OF THE DISCLOSURE

Benzoisothiazol derivatives having the formula:

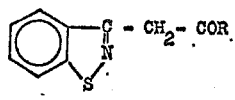

wherein:

R is either OY wherein Y is hydrogen,
a metal, ammonium,
or a straight- or branched-chain alkyl;
or R is

wherein $R_1$ is hydrogen, alkyl, cycloalkyl or a nucleus of the phenyl series and $R_2$ is hydrogen, alkyl, cycloalkyl, amino or a nucleus of the phenyl series, are useful as herbicides.

The foregoing compound may be prepared by reacting 3-chloro-4,5 benzoisothiazol dissolved in an anhydrous organic solvent (e.g., anhydrous ethanol) with a carbanion generating substance (e.g., diethylmalonate in presence of sodium ethoxide) while maintaining this mixture at its boiling point for several hours, thus obtaining the corresponding esters (e.g., 4,5-benzoisothiazol-3-ethyl-acetate). From the esters, other compounds within the foregoing general formula may be prepared by conventional prior art methods.

BACKGROUND OF THE INVENTION (1) Field of the invention

The present invention pertains to the field of plant growth regulation.

More particularly, this invention relates to a novel class of benzothiazol derivatives useful as herbicides, and to a method of preparing the same.

This invention also relates to herbicidal compositions of matter comprising said novel benzothiazol derivatives and to a method of treating growing plants with said compositions.

(2) Description of the prior art 4,5-benzoisothiazolin-3-one as well as a process for its preparation, are well known. See, e.g., E. V. McClelland and A. J. Gait (1926) J. Chem. Soc., 921; F. Gialdi, R. Ponci and A. Baruffini (1961) "Il Farmaco," Ed. Sc., 509; R. Fischer and G. Hurni (1964) Arzneimit. Forsch., 1301.

Also 3-chloro-4,5-benzoisothiazol and its method of preparation are well known. See, e.g., A. Reissert (1928) Ber., 61, 1680; H. Boshagen (1966) Ber., 99, 2566.

According to the prior art, the preparation of 4,5-benzoisothiazolin-3-one and of 3-chloro-4,5-benzoisothiazol, is as follows:

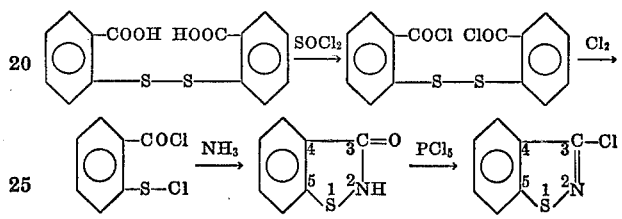

4,5-benzoisothiazolin-3-one  3-chloro-4,5-benzoisothiazol.

SUMMARY OF THE INVENTION

We have now discovered a novel class of compounds which are endowed with an unexpected and extraordinary high degree of hormone-type of herbicidal activity. These compounds are benzoisothiazol derivatives, having the general formula:

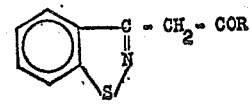

wherein:

R is either OY wherein Y is hydrogen,
a metal, ammonium, or
a straight- or branched-chain alkyl;
or R is the group of the formula

wherein $R_1$ is hydrogen, alkyl, cycloalkyl or a nucleus of the phenyl series and $R_2$ is hydrogen, alkyl, cycloalkyl, amino or a nucleus of the phenyl series.

More particularly, according to one of its aspects, our invention relates to 3-benzoisothiazolacetic acid:

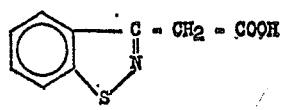

and to its salts and functional derivatives such as esters, amides, hydrazides, anilides and the like.

According to another aspect, our invention also relates to a process for achieving the bonding of a carbonyl containing group onto the benzoisothiazol nucleus. Thus, we have further surprisingly discovered that the chlorine atom bonded to the benzoisothiazol nucleus is provided with sufficient reactivity to induce reaction with carbanion generating substances. This result was absolutely unexpected in view of the structure and properties of the benzothiazol nucleus.

More particularly, we have found a process for preparing the foregoing compounds, this process substantially comprising reacting 3-chloro-benzoisothiazol with a carbanion generating substance, for example, diethyl malonate, in the presence of sodium ethoxide.

DESCRIPTION OF PREFERRED EMBODIMENTS

Our invention comprises a new class of benzoisothiazol derivatives useful as herbicides, having the general formula:

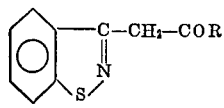

wherein:

R is either OY wherein Y is hydrogen, a metal, ammonium or a lower straight- or branched-chain alkyl, or R is a group of the formula

wherein $R_1$ is hydrogen, alkyl, cycloalkyl or a nucleus of the phenyl series and $R_2$ is hydrogen, alkyl, cycloalkyl amino or a nucleus of the phenyl series.

Hereinbelow are listed representative compounds of the foregoing class:

Benzoisothiazol-3-acetic acid

Melting point: 154° C.; soluble in alcohol, benzene; slightly soluble in water. Crystallized by water.

Benzoisothiazol-3-acetamide

Melting point: 184°–185°, soluble in alcohol and benzene; slightly soluble in ether; insoluble in ligroin, petroleum ether and water. Crystallized by water-alcohol.

N-methyl-benzoisothiazol-3-acetamide

Melting point: 126°–127° C., soluble in alcohol and benzene; slightly soluble in ether and water; insoluble in ligroin, petroleum ether. Crystallized by benzene-ligroin.

N,n-propyl-benzoisothiazol-3-acetamide

Melting point: 113°–114° C.; solutble in alcohol, benzene; slightly soluble in ether, water; insoluble in petroleum ether and in ligroin. Crystallized by water-alcohol.

N-ethyl-benzoisothiazol-3-acetamide

Melting point: 140°–141° C.; soluble in alcohol, benzene; slightly soluble in ether, water; insoluble in ligroin, petroleum ether. Crystallized by benzene-ligroin.

Benzoisothiazol-3-ethylcyanacetate

Melting point: 150°–151° C., soluble in alcohol; insoluble in water and ether. Crystallized by alcohol.

Benzoisothiazol-3-ethylacetate

Melting point: 46.5° C., soluble in alcohol, ether, benzene; slightly soluble in petroleum ether; insoluble in water. Boiling point: 114° C. at 0.2 mm.

Benzoisothiazol-3-acethydrazide

Melting point: 193°–194° C.; soluble in alcohol, benzene, diluted mineral acids; slightly soluble in water; insoluble in ligroin, petroleum ether. Crystallized by water-alcohol.

N(3-chlorophenyl)-benzoisothiazol-3-acetamide

Melting point: 137°–138° C., soluble in alcohol, benzene; slightly soluble in water; insoluble in ligroin, petroleum ether. Crystallized by water-alcohol.

N-phenyl-benzoisothiazol-3-acetamide

Melting point: 155°–156° C., (from benzene); microcrystalline white powder; soluble in ethanol; insoluble in water.

N(3,4-dichlorophenyl)-benzoisothiazol-3-acetamide

Melting point: 162°–163° C. (from benzene-ligroin); microcrystalline white powder; soluble in ethanol, benzene; insoluble in water.

N(3-methylphenyl)-benzoisothiasol-3-acetamide

Melting point: 149°–150° C. (from benzene-ligroin); white needles; soluble in benzene, ethanol; insoluble in water, petroleum ether.

N-n-butyl-benzoisothiazol-3-acetamide

Melting point: 96° C. (from ligroin); white needles; soluble in ethanol, benzene; insoluble in water.

N(2-chlorophenyl)-benzoisothiazol-3-acetamide

Melting point: 135–136° C. (from benzene); microcrystalline white powder; soluble in ethanol; slightly soluble in ether; insoluble in water.

N(4-chlorophenyl)-benzoisothiazol-3-acetamide

Melting point: 186°–187° C. (from benzene); white microcrystalline powder; soluble in ethanol; slightly soluble in ether; insoluble in water.

N-(2,4-dichlorophenyl)-benzoisothiazol-3-acetamide

N(3-nitrophenyl)-benzoisothiazol-3-acetamide

Melting point: 186°–187° C. (from benzene); white needles; soluble in ethanol; insoluble in water.

N-(cyclohexyl-benzoisothiazol-3-acetamide

Melting point 157°–158° C. (from benzene); white needles; soluble in ethanol; insoluble in water.

Benzoisothiazol-3-n-butyl-acetate

Boiling point: 115°–120° C. at 0.40 mm. Hg; yellow oil; soluble in ethyl ether, benzene, ethanol; insoluble in water.

Benzoisothiazol-3(2-ethylhexyl)acetate

Boiling point: 126°–130° C. at 0.15 mm. Hg; yellow oil; soluble in ethyl ether, benzene, ethanol; insoluble in water.

Benzoisothiazol-3-n-propyl-acetate

Boiling point: 127°–130° C. at 0.40 mm. Hg; yellow oil; soluble in ethyl ether, benzene, ethanol; insoluble in water.

Benzoisothiazol-3-n-amyl-acetate

Boiling point: 128°–130° C. at 0.15 mm. Hg; yellow oil; soluble in ethyl ether, benzene, ethanol; insoluble in water.

Benzoisothiazol-3-sodium acetate

Boiling point: 116°–118° C. at 0.35 mm. Hg; yellow oil; soluble in ethyl ether, benzene, ethanol; insoluble in water.

Benzoisothiazol-3-cupric acetate dihydrate

Blue microcrystalline powder.

Benzoisothiazol-3-sodium acetate

White microcrystalline powder; soluble in water; slightly soluble in ethanol.

Our invention also comprises a process for preparing the compounds of the foregoing class. This process comprises reacting 3-chloro-benzoisothiazol with a carbanion generating substance, such as diethyl malonate, ethyl cyanacetate, or ethyl acetoacetate.

The preparation of 3-chloro-benzioisothiazol, as previously mentioned, has already been described in the prior art. In its preparation from benzoisothiazolin-3-one, we have found it more economical and technically convenient to use $POCl_3$ in the presence of pyridine instead of $PCl_5$, while heating for about 5 hours at a temperature between 120° and 140° C. The reaction adduct was an oily liquid. It was solidified by pouring it onto ice. The raw product was collected by filtration and, after repeated washing with water, was purified by distillation in vapour current. The yield was 80%.

The preparation of carbanion generating substances is also well known in the prior art. For instance, it is known that, when treated with sodium ethoxide in absolute alcohol, malonic ester is largely converted into its salt, i.e., sodiomalonic ester, containing the carbanion $$CH(COOC_2H_5)_2^-$$

Particularly suitable carbanion generating substances include strongly basic non-aqueous solutions of diethyl malonate (malonic ester), ethyl cyanacetate and acetoacetic ester. Suitable strongly basic substances include alkali metal alkoxides, for example, sodium or potassium methoxide and sodium or potassium ethoxide, the preferred solvents being the corresponding anhydrous alcohols.

In one preferred method for carrying out the reaction of the present invention, the 3-chlorobenzoisothiazol, before being reacted with the carbanion generating substance, if first dissolved in an anhydrous organic solvent. Particularly suitable 3-chloro-benzoisothiazol solvents include anhydrous alcohols, as e.g., anhydrous methanol or ethanol. Preferably, the solvent should be the same as that in which the carbanion generating substance is dissolved.

The reaction mixture is then refluxed for several hours, e.g., from about 3 to 9 hours, while agitating. From this mixture, the reaction product (e.g., benzoisothiazol-3-ethylacetate or benzoisothiazol - 3 - ethylcyanacetate, as shown in the following reaction outline) is isolated by using conventional prior art techniques. This isolation may be accomplished, e.g., by evaporating the solvent under vacuum, adding water to the residue and extracting the reaction product therefrom with ether. After drying, the ether phase is rectified under high vacuum and the overhead portion, which consists of the above-mentioned ester, collected.

From these esters, all the other compounds of the foregoing class are easily obtained by using conventional prior art methods. For instance, from benzoisothiazol-3-ethylacetate or benzoisothiazol-3-ethylcyanoacetate, the alkaline salts of benzoisothiazol-3-acetic acid are readily obtained by saponification with an aqueous alkali solution. The free acid can then be obtained by acidification.

Besides those directly obtainable from the malonic synthesis, other esters of benzoisothiazol-3-acetic acid may be obtained by direct esterification of the acid or by transesterification of the foregoing esters, by using conventional techniques.

From the esters, derivatives of the following type may be obtained by ammonolysis with ammonia or aliphatic amines or hydrazine:

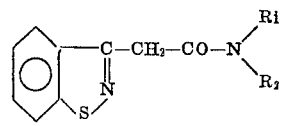

wherein $R_1$ and $R_2$ have the above specified meanings.

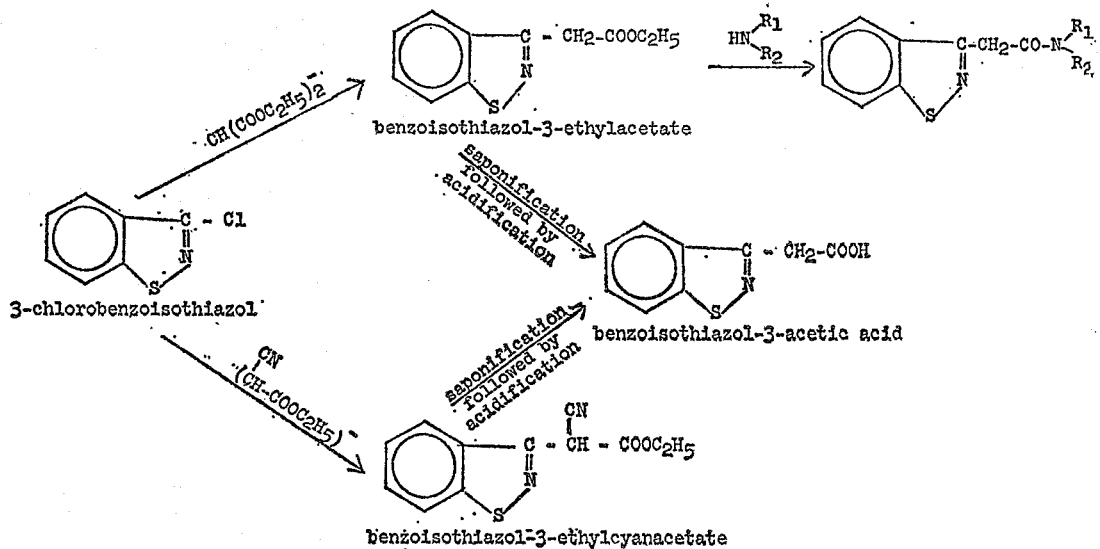

The following examples will further illustrate the preparation and properties of some of the new compounds of the invention:

EXAMPLE I

Preparation of benzoisothiazol-3-ethylacetate

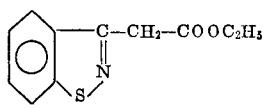

2.3 g. of Na were reacted with 70 ml. of anhydrous ethanol by slightly heating the mixture. After cooling, 16 g. of rectified diethyl malonate were added to the solution, which was then refluxed for 15 minutes. The mixture was then cooled to about 40° C. Then 14 g. of 3-chlorobenzoisothiazol dissolved in a minimum amount of anhydrous ethanol were added dropwise while stirring.

The reaction mixture was then heated to boiling and maintained at the boiling point for 4 hours, while stirring. The solvent was evaporated under vacuum and the residue was dissolved in water and extracted with ether. The ether phase, after drying over $Na_2SO_4$ was rectified under high vacuum, after solvent removal.

The fraction distilling off at 114° C. (0.2 mm. Hg) was collected. 11 g. of benzoisothiazol-3-ethylacetate were thus obtained. As obtained, this compound was an oil that slowly solidified on storage at room temperature (M.P. 46.5° C.). It was soluble in alcohol, ether and benzene; slightly soluble in petroleum ether and insoluble in water.

Analysis.—Found (percent): C, 59.70; H, 5.19; S, 14.23. Calculated (percent): C, 59.71; H, 5.01; S, 14.49.

EXAMPLE II

Preparation of benzoisothiazol-3-ethylcyanacetate

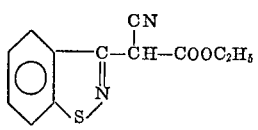

Under the conditions described in Example I for the similar reaction with diethyl malonate, 2.3 g. of metallic sodium were reacted with 11.3 g. of rectified ethyl cyanacetate. To the solution thus obtained, 14 g. of 3-chlorobenzoisothiazol were added and the reaction mixture was then heated to boiling and maintained at the boiling point, while stirring for 8 hours. The ethanol was then evaporated and the residue dissolved in water; 14 g. of the resulting compound were collected by filtration and recrystallized from ethanol. This compound showed a melting point of 150°–151° C. and was identified as benzoisothiazol-3-ethyl cyanacetate, a crystalline solid in the form of yellow needles, soluble in alcohol, and insoluble in water and ether.

Analysis.—Found (percent): C, 58.40; H, 4.05; S, 12.84. Calculated (percent): C, 58.52; H, 4.09; S, 13.02.

EXAMPLE III

Preparation of benzoisothiazol-3-acetic acid

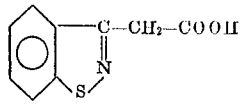

(A) Preparation by saponification of benzoisothiazol-3-ethyl acetate.—The raw benzoisothiazol-3-ethyl acetate was saponified in 10% aqueous NaOH by refluxing for about 1 hour. After cooling, the mixture was acidified to Congo Red and a crystalline solid precipitated and collected by filtration. The yield was 85%. The product, after being recrystallized from water, melted at 153°–154° C., and was a white, crystalline powder, soluble in alcohol and benzene, and slightly soluble in water.

Analysis.—Found (percent): C, 55.92; H, 3.69; S, 16.63. Calculated (percent): C, 55.94; H, 3.64; S, 16.59.

(B) Preparation from benzoisothiazol-3-ethyl cyanacetate.—The raw benzoisothiazol-3-ethyl cyanacetate was saponified in 10% aqueous NaOH by refluxing for about 1 hour. After cooling, the mixture was acidified to Congo Red and the crystalline solid which precipitated was collected by filtration. The yield was 83%. The melting point was 153°–154° C.

EXAMPLE IV

Preparation of benzoisothiazol-3-acetamide

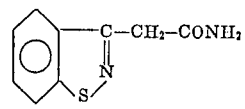

To 10 g. of benzoisothiazol-3-ethylacetate were added, while cooling and stirring, 500 ml. of 35% aqueous $NH_3$. Stirring was continued until the oily particles disappeared and precipitation was completed. 8 g. of benzoisothiazol-3-acetamide were obtained which, after being crystallized from a water-ethanol mixture, showed a melting point of 184°–185° C.

This compound was in the form of very thin white needles, soluble in alcohol, slightly soluble in ether and insoluble in water.

Analysis.—Found (percent): C, 56.33; H, 4.15; S, 16.71. Calculated (percent): C, 56.23; H, 4.19; S, 16.68.

EXAMPLE V

Preparation of benzoisothiazol-3-N-methylacetamide

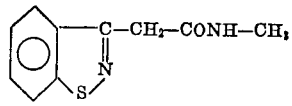

10 g. of benzoisothiazol-3-ethylacetate were reacted under the same conditions described in Example IV with 33% aqueous $CH_3NH_2$. 8 g. of a solid product were obtained which, when crystallized from benzene-ligroin, showed a melting point of 126°–127° C. This compound, which was benzoisothiazol-3-N-methylacetamide, crystallized in the form of white needles, which were soluble in alcohol and in benzene, slightly soluble in ether and water, and insoluble in ligroin and petroleum ether.

Analysis.—Found (percent): C, 58.49; H, 4.85; S, 15.64. Calculated (percent): C, 58.23; H, 4.89; S, 15.54.

EXAMPLE VI

Preparations of benzoisothiazol-3-acethydrazide

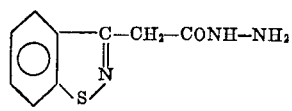

To 10 g. of benzoisothiazol-3-ethylacetate dissolved in a minimum amount of methanol were added 100 ml. of a 50% aqueous solution of hydrazine, while cooling and vigorously stirring. Stirring was continued for 1 hour. 8 g. of a solid product were obtained and separated by filtration. This product was recrystallized from water and showed a melting point of 193°–194° C. The crystallized compound was benzoisothiazol-3-acethydrazide in the form of white needles, which were soluble in alcohol, benzene and diluted mineral acids, slightly soluble in water and insoluble in ligroin and petroleum ether.

*Analysis.*—Found (percent): C, 52.25; H, 4.30; N, 20.47. Calculated (percent): C, 52.16; H, 4.38; N, 20.27.

EXAMPLE VII

Preparation of benzoisothiazol-3-N-n-propylacetamide

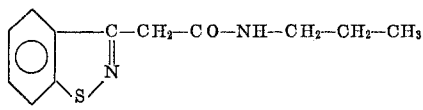

To 10 g. of benzoisothiazol-3-ethylacetate were added 20 g. of n-propylamine, while heating at the boiling point for 2 hours. From the reaction mixture, by addition of petroleum ether, 9 g. of a solid product were separated. This product, crystallized from an aqueous ethanol solution, showed a melting point of 113°–114° C. and was benzoisothiazol-3-N-n-propylacetamide.

The compound crystallized into very thin white needles which were soluble in alcohol and benzene, slightly soluble in ether and water and insoluble in petroleum ether and ligroin.

*Analysis.*—Found (percent): C, 61.79; H, 6.03; S, 13.76. Calculated (percent): C, 61.51; H, 6.02; S, 13.68.

EXAMPLE VIII

Preparation of benzoisothiazol-3-N-(3,4-dichlorophenyl)acetamide

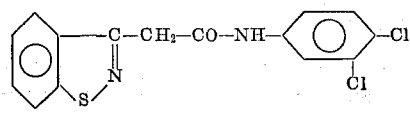

This compound was obtained in a similar manner to that described in Example VII. 13.5 g. of benzoisothiazol-3-ethylacetate were reacted with 13 g. of 3,4-dichloroaniline, at 170° C. for 3 hours. After cooling, the reaction adduct was extracted with petroleum ether. The solid that separated was then filtered and crystallized from a benzene-ligroin mixture. The yield was 60%. The product was in the form of a white microcrystalline powder which was soluble in ethanol and benzene and insoluble in water. Its melting point was 162°–163° C. (from benzene-ligroin).

*Analysis.*—Found (percent): C, 53.13; H, 2.90; Cl, 21.32. Calculated (percent): C, 53.42; H, 2.99; Cl, 21.03.

EXAMPLE IX

Preparation of benzoisothiazol-3-N(3-methylphenyl)acetamide

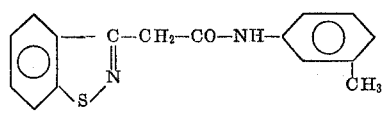

This compound was obtained in the same manner as described for benzoisothiazol-3-N(3,4-dichlorophenyl)acetamide (Example VIII). 13.2 g. of benzoisothiazol-3-ethylacetate were reacted with 9 g. of m. toluidine, obtaining a yield of about 65%. The product was in the form of white needles when crystallized from ligroin-benzene. It was soluble in benzene and ethanol and insoluble in water and petroleum ether. The melting point was 149°–150° C.

*Analysis.*—Found (percent): C, 68.30; H, 4.87; S, 11.47. Calculated (percent): C, 68.06; H, 5.00; S, 11.35.

EXAMPLE X

Preparation of benzoisothiazol-3-N(4-nitrophenyl)acetamide

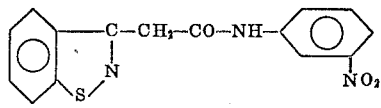

This substance was prepared in the same manner as the preparation of benzoisothiazol-3 - N(3,4-dichlorophenyl)acetamide (Example VIII). 13.5 g. of benzoisothiazol-3-ethylacetate were reacted with 11.0 g. of m. nitroaniline, obtaining a yield of about 60%.

The product, first crystallized from a benzene-ligroin mixture and then from benzene, was in the form of white needles and was soluble in ethanol and insoluble in water. It had a melting point of 185°–186° C.

*Analysis.*—Found (percent): C, 57.51; H, 3.57; N, 13.49. Calculated (percent): C, 57.50; H, 3.54; N, 13.41.

EXAMPLE XI

Preparation of benzoisothiazol-3-N-cyclohexylacetamide

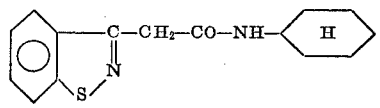

The product was obtained in the same manner as the preparation of benzoisothiazol-3-N(3,4-dichlorophenyl) acetamide (Example VIII). 13.5 g. of ethyl 3-benzoisothiazol-3-ethylacetate were reacted with 8 g. of cyclohexylamine, while heating at 145°–150° C. for 3 hours. After cooling, the solid mass was crystallized from benzene. The yield was 70%. The crystallized product, which was in the form of white needles, was soluble in ethanol and insoluble in water. Its melting point was 157°–158° C.

*Analysis.*—Found (percent): C, 65.91; H, 6.78. Calculated (percent): C, 65.66; H, 6.61.

EXAMPLE XII

Preparation of benzothiazol-3-(2-ethylhexyl)acetate

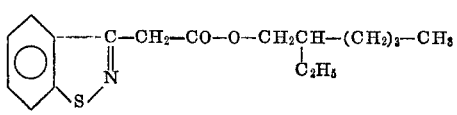

To 300 g. of 2-ethylhexanol, previously saturated when cold with dry HCl, were added 30 g. of benzoisothiazol-3-acetic acid. The mixture was refluxed for 7 hours. The excess alcohol was then removed by distillation under vacuum and the residue rectified under reduced pressure, collecting the fraction distilling at 127°–130° C. at a pressure of 0.2 mm. Hg. The yield was 70%. The product obtained was a yellow oil, soluble in ethyl ether, benzene and ethanol and insoluble in water.

*Analysis.*—Found (percent): C, 66.90; H, 7.72; S, 10.47. Calculated (percent): C, 66.58; H, 7.59; S, 10.50.

EXAMPLE XIII

Preparation of benzoisothiazol-3-N-ethylacetamide

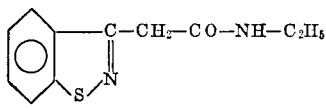

10 g. of benzoisothiazol-3-ethylacetate were reacted under the same conditions described in Example V with 33% aqueous $C_2H_5NH_2$. 9 g. of a solid product were obtained which, when crystallized from a benzene-ligroin mixture, melted at 140°–141° C. The product, which was benzoisothiazol-3-N-ethylacetamide, was in the form of a white microcrystalline powder soluble in alcohol and benzene, slightly soluble in ether and water and insoluble in ligroin and petroleum ether.

*Analysis.*—Found (percent): C, 59.89; H, 5.39; S, 14.62. Calculated (percent): C, 59.98; H, 5.49; S, 14.55.

EXAMPLE XIV

Preparation of benzoisothiazol-3-N-(3-chlorophenyl)acetamide

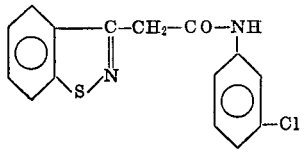

To 8.8 g. of benzoisothiazol-3-ethylacetate were added 6.7 g. of chloroaniline. After heating at 170° C. for 3 hours, the reaction mixture was cooled and washed with ether. The solid that separated was crystallized from benzene. 7 g. of benzoisothiazol-3-N(3-chlorophenyl)acetamide were obtained. The product showed a melting point of 137°–138° C.

The product obtained was in the form of a crystalline solid consisting of white scales and was soluble in alcohol and benzene, slightly soluble in water and insoluble in ligroin and petroleum ether.

*Analysis.*—Found (percent): C, 59.67; H, 3.74; Cl, 11.66. Calculated (percent): 59.50; H, 3.66; Cl, 11.71.

EXAMPLE XV

Preparation of benzoisothiazol-3-cupricacetatedihydrate

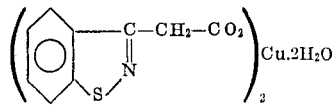

The compound was directly precipitated by adding to a boiling aqueous solution of benzoisothiazol-3-acetic acid (4 g.), a boiling aqueous solution of copper sulphate (25 g. of $CuSO_4.5H_2O$). The precipitate was separated by filtration, thoroughly washed with hot water and air dried. The yield was almost quantitative. The product obtained was a bluish microcrystalline powder which was insoluble in water and in most common organic solvents.

*Analysis.*—Found (percent): C, 44.30; H, 3.19; Cu, 12.90. Calculated (percent): C, 44.66; H, 3.33; Cu, 13.13.

Our invention also comprises herbicidal compositions containing as the active herbicidal component the compounds of the present invention.

We have found that the compounds of the present invention affect growth and spread of cells and consequently the phenomena of epinasty, the formation of adventitious roots and seed germination. The herbicidal activity of the compounds of the present invention is quite different from that shown by prior art substances with hormone action such as, for instance, 3-indolacetic acid, hereinbelow referred to as (IAA), 3-indolbutyric acid, hereinbelow referred to as (IBA), and 2-4-dichlorophenoxyacetic acid, hereinbelow referred to as (2,4 D).

For practical weed control, the compounds of the present invention are used in quantities that vary considerably depending on the nature of the particular compound, the growth stage and weeds to be controlled, the method of application, the nature of soil and the type of formulation adopted. Since these are very active substances, comparatively small quantities will generally suffice per surface unit. Far lower amounts are obviously required when it is sufficient to only regulate or retard weed growth rather than effect total kill.

Generally, weed-killing is attained by applying 0.5–8 kg. of active compound per hectare (ha.). On the basis of the experimental tests conducted on a number of weeds, including *Amarantus retroflexus, Artemisia vulgaris, Chenopodium album, Conolvulus sepium, Echinocloa crus-gali, Setaria glauca,* and *Vicia sativa* and on useful plants, including *Avena sativa* (oats), *Beta vulgaris, Phaseolus vulgaris* (beans), *Pisum sativum* (peas), *Solanum lycopersicum, Triticum vulgare* and *Zea mais,* both in pre-emergence and in post-emergence, we have found that:

(a) (IAA) and (IBA) turn out to be ineffective when applied in pre-emergence; when used in post-emergence they display a notable activity on dicotyledons and—to a lesser extent—on gramineae.

(b) (2,4 D) is active both in pre- and post-emergence; in the former case its activity is high on *Convolvulus saepium* and *Vicia sativa,* fairly good on *Amarantus retroflexus* and *Artemisia vulgaris,* poor on *Chenopodium album* and gramineae; in post-emergence, the activity of (2,4 D) is high on all species with the exception of gramineae.

We have also found that the compounds of the present invention are very effective both in pre- and post-emergence and, unlike the reference products, this activity is more or less evident on all the weeds under consideration.

Selectivity is another differential characteristic typical of the compounds of the present invention. In pre-emergence treatments, *Avena sativa, Phaseolus vulgaris, Pisum sativum, Triticum vulgare* and *Zea mais* are not damaged with dosage levels that inhibit the growth of dicotoyledon weeds; under the same conditions (2,4 D) is selective on *Avena sativa, Triticum vulgare* and *Solanum lycopersicum.*

The behavior of the compounds of this invention, compared with that of (2,4 D) is also different as regards gramineae, since, as stated above, these products are active against gramineae weeds, whereas (2,4 D) shows poor control of these.

It is evident from the foregoing that one o fthe preferential fields of application of the compounds of the present invention is selective pre-emergence weeding of crops such as, for instance, *Pisum sativum, Phaseolus vulgaris, Avena sativa, Triticum vulgare,* and *Zea mais.*

The following data will further illustrate the activity of some of the compounds of this invention when applied to certain of the foregoing plant species, it being understood that they can also be used in the control and treatment of other plant species.

In pre-emergence week-killing treatments, the soil was treated with a quantity of active ingredient ranging from a maximum of 6 kg./ha. to a minimum of 0.500 kg./ha.; in post emergence treatments the plants were sprayed with the same quantities of active compound per hectare.

The following scale was used to evaluate the results obtained, which results are reported in the following Tables I–IV.

Post-emergence

0=no damage
1=poor activity,
2=signs of neoformations or epinasty, which however do not affect the further growth of the plant;
3=neoformations of relatively severe distortions with consequent arrest of growth;
4=distortions or necrosis affecting the vitality of the plant, until causing its death.

Pre-emergence

0=no activity and no difference compared with the control;
1=poor activity;
2=activity of some consequence with limited damage which does not usually affect the vitality of plants.

3=considerable activity with damage seriously affecting the further growth of most plants;
4=highest activity preventing germination or causing plants to die.

In the case of intermediate activity between two classes of the range, both values are reported, indicating first the one corresponding to the nearest value. In Tables I–IV, the following abbreviations were employed:

ABBREVIATION (A) Weeds

Am=*Amarantus retroflexus* L.
Art=*Artemisia vulgaris* L.
Che=*Chenopodium album* L.
Con=*Convolvulus sepium* L.
Gia=*Echinocloa crus-galli* R.S.
Set=*Setaria glauca* L.
Vic=*Vicia sativa* L.

(B) Useful plants

Av=*Avena sativa* L.
Biet=*Beta vulgaris*
Fag=*Phaseolus vulgaris*
Pis=*Pisum sativum*
Pom=*Solanum lycopersicum*
Fr=*Triticum vulgare*
Mais=*Zea mais*

TABLE I.—WEEDS

| Chemical | Dose, kg./ha. | Pre-emergence | | | | | | | Post-emergence | | | | | | |
|---|---|---|---|---|---|---|---|---|---|---|---|---|---|---|---|
| | | Am | Art | Che | Con | Gia | Set | Vic | Am | Art | Che | Con | Gia | Set | Vic |
| 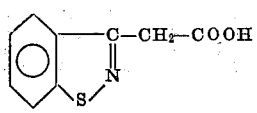 | 4<br>2<br>1<br>0.5 | 4<br>4<br>4<br>3 | 4<br>4/3<br>3/4<br>3 | 4/3<br>3<br>3<br>2 | 4<br>4/3<br>3/4<br>3 | 3<br>1/2<br>1<br>1 | 3/4<br>3<br>2<br>1/2 | 4<br>3<br>3/2<br>2 | 4<br>4<br>4<br>4/3 | 4<br>4<br>3/4<br>3 | 4/3<br>3/4<br>3<br>3 | 4<br>4<br>4<br>3 | 2<br>2<br>2/1<br>1 | 3<br>2/3<br>2/1<br>1 | 4/3<br>3<br>3<br>2/3 |
| 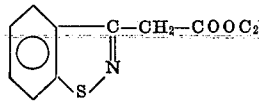 | 6 | 4 | 4 | 3 | 4 | 3 | 4/3 | 4/3 | 4 | 4 | 4 | 4 | 4/3 | 4/3 | 4 |
| 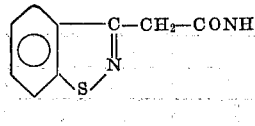 | 6<br>4<br>2<br>1 | 4<br>4<br>4<br>4/3 | 4<br>4<br>4<br>3/4 | 4/3<br>4/3<br>4/3<br>3 | 4<br>4<br>4/3<br>3/4 | 3<br>3/2<br>2<br>2/1 | 4/3<br>3/4<br>3<br>3/2 | 4/3<br>4/3<br>3/4<br>2/3 | 4<br>4<br>4<br>4 | 4<br>4<br>4<br>4/3 | 4/3<br>3/4<br>3<br>2/3 | 4<br>4<br>4<br>3/4 | 3<br>2<br>2/1<br>1 | 3/4<br>3<br>3/2<br>2 | 4/3<br>3/4<br>3/2<br>2 |
| 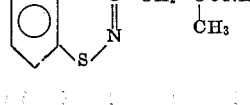 | 6 | 1/2 | 3/4 | 1 | 4/3 | 1 | 2/3 | 1 | 2 | 3 | 2/3 | 3 | 1 | 2 | 1/2 |
| 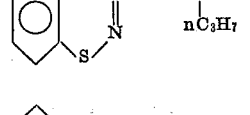 | 6 | 2 | 3/4 | 2 | 4 | 3 | 3 | 3 | 2/3 | 3 | 3/2 | 3 | 1 | 3/4 | 1/2 |
| 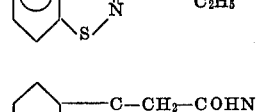 | 6 | 4 | 4 | 3/4 | 4 | 2/3 | 3 | 3/4 | 4 | 4 | 4 | 4 | 2 | 4/3 | 4 |
| 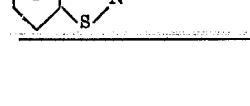 | 6 | 4 | 4/3 | 4/3 | 4 | 3 | 3/4 | 3 | 3/4 | 4 | 3 | 4 | 2/1 | 3 | 4/3 |

TABLE II.—WEEDS—CONTINUED
| Chemical | Dose g./ha. | Pre-emergence ||||||| Post-emergence |||||||
|---|---|---|---|---|---|---|---|---|---|---|---|---|---|---|---|
| | | Am | Art | Che | Con | Gia | Set | Vic | Am | Art | Che | Con | Gia | Set | Vic |
| 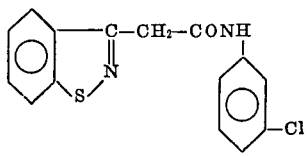 | 6 | 4 | 4/3 | 3/4 | 4 | 3 | 3 | 3 | 2 | 2/3 | 2 | 4/3 | 1 | 3 | 0/1 |
| 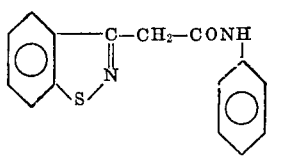 | 6 | 4 | 4/3 | 2/3 | 4 | 3 | 3/4 | 2 | 3 | 3 | 2 | 3 | 2/3 | 2/3 | |
| 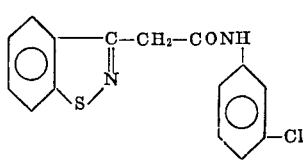 | 6 | 1 | 3 | 0/1 | 4 | 2 | 3 | 0/1 | 1 | 1 | 1 | 2/3 | 1 | 1 | 0/1 |
| 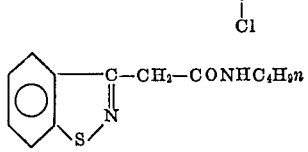 | 6 | 4/3 | 4 | 3/4 | 4 | 2 | 3/4 | 1 | 3/4 | 1 | 2/3 | 0/1 | 0 | 1/2 | 1/2 |
| 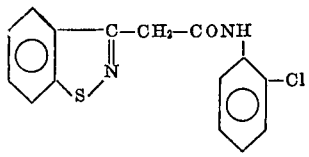 | 6 | 4 | 3/4 | 2/3 | 3 | 1 | 2/3 | 1 | 3/4 | 1 | 2/3 | 0/1 | 0 | 1/2 | 1/2 |
| 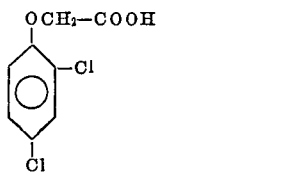 | 4 | 3 | 3/4 | 1 | 4 | 1 | 1 | 4 | 4 | 4 | 4 | 4 | 2 | 1/2 | 4 |
| | 2 | 2 | 3 | 0/1 | 4 | 1 | 0/1 | 4 | 4 | 4 | 4 | 4 | 1 | 1/0 | 4 |
| | 1 | 1 | 2 | 0/1 | 4 | 0/1 | 0/1 | 3/4 | 4 | 4/3 | 4/3 | 4 | 1 | 0/1 | 4 |
| | 0.5 | 0/1 | 1 | 0 | 3/4 | 0 | 0 | 2 | 4 | 3 | 3 | 4 | 0/1 | 0/1 | 3/4 |
TABLE III.—WEEDS—CONTINUED
| Chemical | Dose, kg./ha. | Pre emergence ||||||| Post emergence |||||||
|---|---|---|---|---|---|---|---|---|---|---|---|---|---|---|---|
| | | Am | Art | Che | Con | Gia | Set | Vic | Am | Art | Che | Con | Gia | Set | Vic |
|  | 6 | 4 | 4 | 4 | 4 | 2/3 | 3/4 | 4/3 | 4 | 4 | 4 | 4 | 1/2 | 3 | 4 |
|  | 6 | 4 | 4 | 4 | 4 | 2/3 | 4/3 | 3 | 4 | 4 | 3 | 4 | 1 | 3 | 3/4 |
| 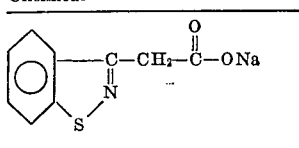 | 6 | 3/4 | 2 | 1/2 | 4 | 2 | 3/4 | 1 | 3 | 4 | 3/4 | 3/4 | 1/2 | 3/ 4 | 0/1 |

TABLE IV.—USEFUL PLANTS

| Chemical | Dose kg./ha. | Pre-emergence | | | | | | | Post-emergence | | | | | | |
|---|---|---|---|---|---|---|---|---|---|---|---|---|---|---|---|
| | | Av | Biet | Fag | Pis | Pom | Fr | Mais | Av | Biet | Fag | Pis | Pom | Fr | Mais |
| 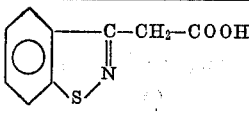 | 2 | 0 | 4 | 1 | 0 | 4 | 0 | 0 | 0 | 3 | 3 | 3 | 4 | 0 | 1/2 |
| | 1 | 0 | 3 | 0 | 0 | 3 | 0 | 0 | 0 | 3 | 3 | 1/2 | 4 | 0 | 0 |
| | 0.5 | 0 | 2 | 0 | 0 | 3 | 0 | 0 | 0 | 2 | 2/3 | 1 | 3/4 | 0 | 0 |
| 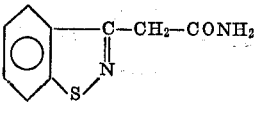 | 2 | 0 | 4/3 | 1 | 1 | 4 | 0 | 0 | 0 | 4/3 | 3 | 1/2 | 4 | 0 | 1/2 |
| | 1 | 0 | 3/2 | 0 | 0 | 3 | 0 | 0 | 0 | 3 | 2/3 | 1/2 | 4/3 | 0 | 1 |
| | 0.5 | 0 | 1/2 | 0 | 0 | 2/3 | 0 | 0 | 0 | 2/3 | 2 | 1 | 3/4 | 0 | 0 |
| 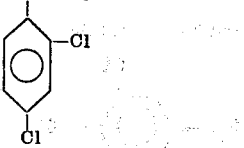 | 2 | 0/1 | 3/2 | 3 | 4/3 | 1 | 1 | 0/1 | 1 | 4 | 4 | 4 | 4/3 | 1 | 2 |
| | 1 | 0/1 | 2/3 | 3 | 3 | 0/1 | 0 | 0/1 | 1 | 3/4 | 4/3 | 4 | 3 | 0/1 | 1/2 |
| | 0.5 | 0 | 2 | 1/2 | 2/3 | 0/1 | 0 | 0 | 0 | 3/2 | 3 | 4 | 3 | 0 | 0/1 |

As mentioned above, the products of the present invention can be profitably used to control weeds, generally employing lesser quantities than with prior art herbicides, and may be applied over wide surface areas. Therefore, in order to be able to distribute the active ingredients evenly, it is necessary to use either compositions containing such ingredients admixed with a great quantity of inert substances which act as diluents, or formulations containing a larger concentration of active ingredient than is required for application and which can be easily diluted before use, either with water or with inert substances. Such compositions may be readily obtained because of the physical and solubility characteristics of the products themselves.

There can be used either solid or liquid compositions. Solid compositions in granulated form are prepared by either thoroughly mixing the active ingredient with solid inert carriers, such as bentonite, calcium carbonate, vermiculite, attapulgite, pyrofillite, sepiolite, phosphorite, superphosphates, etc. or spraying the active ingredient, dissolved in a volatile solvent, on to the granular carrier and then mixing and drying the granules. The concentration of active ingredient may vary within wide limits, e.g., between 0.25% and 80%, preferably between 0.50% and 20%. The size of the particles of the granular carrier may vary from 0.1 to 4 mm., preferably from 0.15 to 0.7 mm.

Powder compositions for dry dusting can be easily obtained by mixing the active ingredients with inert carriers, such as talcum, fossil flours, attapulgite, etc., and by thereafter grinding the mixture until obtaining the fineness required. The active ingredient concentration varies, on an average, between 1% and 20%.

The so-called "wettable powders" are obtained by thoroughly mixing the active ingredients with inert carriers, such as fossil flours, kaolins, attapulgites, pyrofillites, bentonites, anhydrous synthetic silicates, celites, etc. and products with surface active agents, and by thereafter grinding the resulting mixture until reaching the fineness required. By dispersing these powders in water, aqueous suspensions with the desired active ingredients concentrations are obtained. Such aqueous suspensions are then sprayed onto the soil and plants. The active ingredient concentration of this type of composition generally ranges between 10% and 95%.

Emulsifiable liquid compositions can be prepared by dissolving the active ingredient in an inert solvent, preferably one which is slightly soluble in water, such as, for instance, benzene or toluene, and then adding an emulsifying agent. When these compositions are added to water, emulsions are obtained in which the solvent phase is dispersed in the aqueous phase and the active ingredient is kept in solution in the dispersed phase.

It is thus possible to ensure a uniform distribution of the active substance in the aqueous composition to be sprayed onto the soil and plants. The active ingredient content of this type of composition varies markedly according to the solubility of the active ingredient in the liquid medium. It varies, generally, from 10% to 50%.

In the preparation of wettable powders and emulsifiable concentrates, use is made of emulsifying-dispersing agents of the anionic, nonionic or cationic type.

Suitable agents of the anionic type include sodium-dodecylbenzenesulfonate, calicum naphthalene-sulfonate and laurylsulfate. Suitable agents of the active cationic type include compounds of quaternary ammonium, for example, cetylpyridinium bromide, dodecylbenzylmethyl-ammonium chloride and di(hydroxyethyl)-benzyldodecyl-ammonium chloride. Suitable nonionic agents include the condensation products of ethylene oxide with aliphatic alcohols, amines, fatty acids and alkylphenols.

The choice of the most suitable emulsifying, wetting, and dispersing agents can be readily made, a large number of such products being manufactured by specialized firms and available on the market together with details of their properties and preferential uses. As a general rule, surfactants comprise only a small percentage of the composition, normally less than 25%.

The herbicidal compositions of this invention may also be used in combination with other herbicides or pesticides (insecticides, acaricides, fungicides) as well as with other conventional additives.

Having thus described our invention, what we desire to secure by Letters Patent and hereby claim is:

1. A compound having the formula

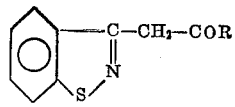

wherein R is either OY or

wherein Y is hydrogen, an alkali or coinage metal, ammonium or a straight- or branched-chain alkyl having 1–7 carbon atoms; $R_1$ is hydrogen, an alkyl having 1–7 carbon atoms; cyclohexyl, phenyl or a chloro-, nitro-, or methyl-substituted phenyl; and $R_2$ is any of the $R_1$ radicals or amino.

2. The compound of claim 1, having the formula

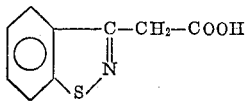

3. The compound of claim 1, having the formula

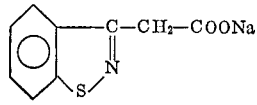

4. The compound of claim 1, having the formula

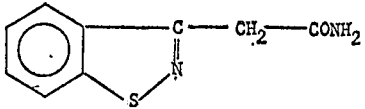

5. The compound of claim 1, having the formula

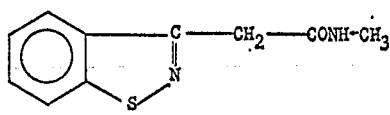

6. The compound of claim 1, having the formula

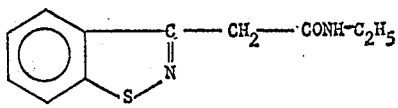

7. The compound of claim 1, having the formula

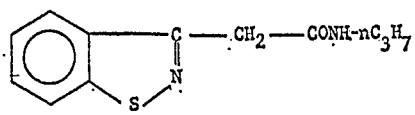

8. The compound of claim 1, having the formula

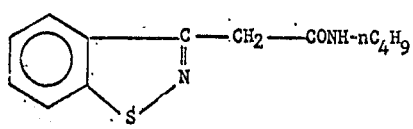

9. The compound of claim 1, having the formula

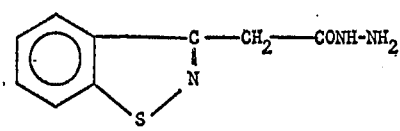

10. The compound of claim 1, having the formula

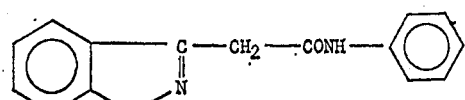

11. The compound of claim 1, having the formula

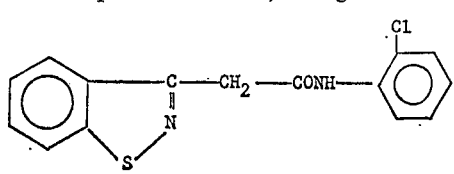

12. The compound of claim 1, having the formula

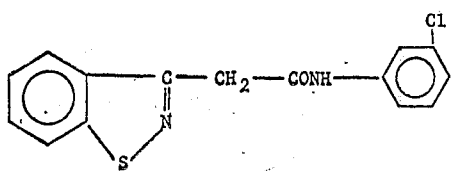

13. The compound of claim 1, having the formula

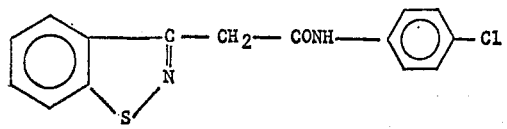

14. The compound of claim 1, having the formula

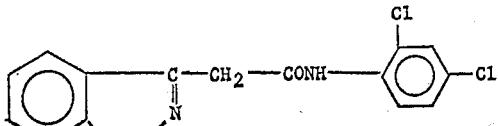

15. The compound of claim 1, having the formula

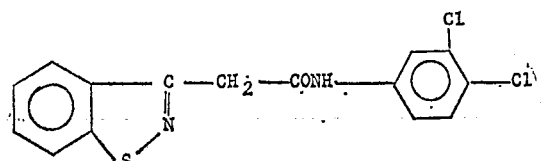

16. The compound of claim 1, having the formula

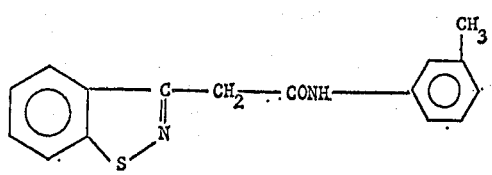

17. The compound of claim 1, having the formula

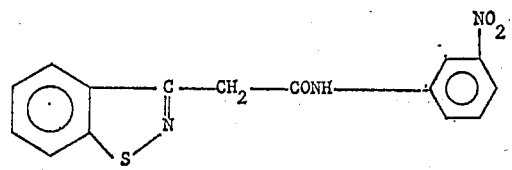

18. The compound of claim 1, having the formula

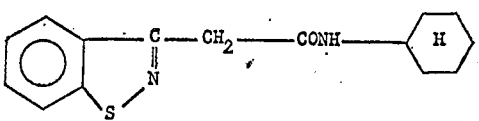

19. The compound of claim 1, having the formula

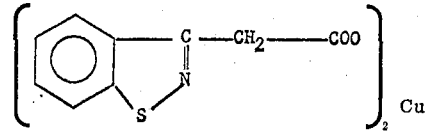

20. The compound of claim 1, having the formula

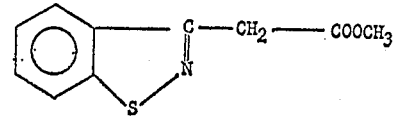

21. The compound of claim 1, having the formula

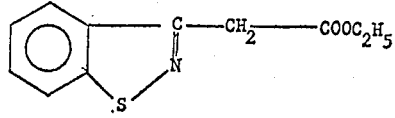

22. The compound of claim 1, having the formula

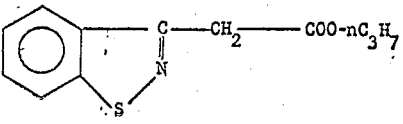

23. The compound of claim 1, having the formula
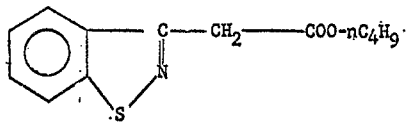
24. The compound of claim 1, having the formula
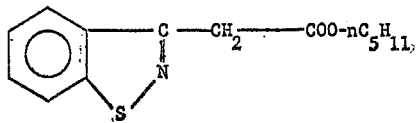
25. The compound of claim 1, having the formula
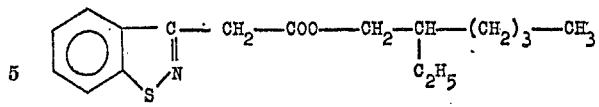
References Cited
UNITED STATES PATENTS
2,985,661   5/1961   Hein et al. _____ 260—304
ALEX MAZEL, Primary Examiner
R. J. GALLAGHER, Assistant Examiner
U.S. Cl. X.R.
71—90; 260—299

PO-1050
(5/69)

UNITED STATES PATENT OFFICE
CERTIFICATE OF CORRECTION

Patent No. 3,657,263                Dated  April 18, 1972

Inventor(s) Tullo Vitali, Pietro Scrivani, Riccardo Ponci, Giovanni Pellegrini, Franco Gialdi and Emilio Arsura It is certified that error appears in the above-identified patent and that said Letters Patent are hereby corrected as shown below:

Column 3, line 56, "184°-185°," should read -- 184°-185°C, --.
Column 4, line 66, "N-(cyclohexyl-" should read -- N-cyclohexyl- --; line 67, "Melting Point" should read -- Melting Point: --; line 73, "0.40 mm Hg" should read -- 0.4 mm Hg --.

Column 5, line 14, "Benzoisothiazol-3-sodium acetate:" should read -- Benzoisothiazol-3-methyl-acetate: --; line 31, "benzioisothiazol" should read -- benzoisothiazol --. Column 10, lines 10 and 11, "benzoisothiazol-3-N(4-nitrophenyl" should read -- benzoisothiazol-3-N(3-nitrophenyl) --; that portion of the first structural formual reading:

"
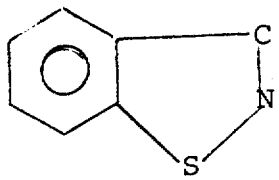
"

should read

-- 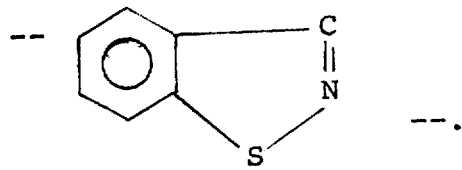 --.

Column 11, line 57 "(percent):59.50; should read -- (percent): C, 59.50; -- .
Column 12, line 35, "Conolvulus" should read -- Convolvulus --.
Column 13, line 19, "neoformations of" should read -- neoformation or --; Table I, fourth structural formula under the heading "Chemical"; that portion of the formula reading:

UNITED STATES PATENT OFFICE
CERTIFICATE OF CORRECTION

Patent No. 3,657,263  Dated April 18, 1972

Inventor(s) Tullo Vitali, Pietro Scrivani, Riccardo Ponci, Giovanni Pellegrini, Franco Gialdi and Emilio Arsura It is certified that error appears in the above-identified patent and that said Letters Patent are hereby corrected as shown below:

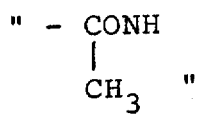  should read  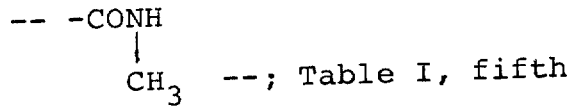 —; Table I, fifth structural formula under the heading "Chemical"; that portion of the formula reading:

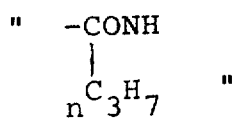  should read  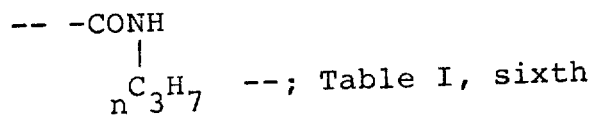 —; Table I, sixth structural formula under the heading "Chemical"; that portion of the formula reading:

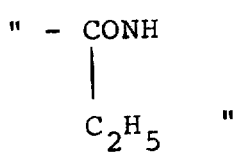  should read  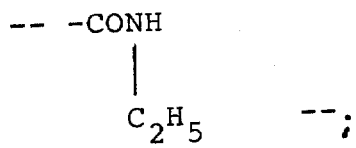 —; Table I, seventh structural formula under the heading "Chemical"; that portion of the formula reading:

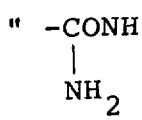  should read   —. Column 15, Table II, first structural formula under the heading "Chemical"; that portion of the formula reading:

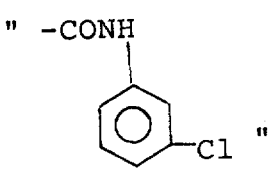  should read  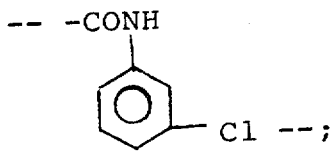 —;

UNITED STATES PATENT OFFICE
CERTIFICATE OF CORRECTION

Patent No. 3,657,263  Dated April 18, 1972

Inventor(s) Tullo Vitali, Pietro Scrivani, Riccardo Ponci, Giovanni Pellegrini, Franco Gialdi and Emilio Arsura It is certified that error appears in the above-identified patent and that said Letters Patent are hereby corrected as shown below:

Table II, second structural formula under the heading "Chemical"; that portion of the formula reading:

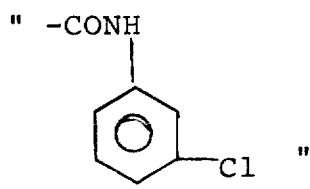   should read   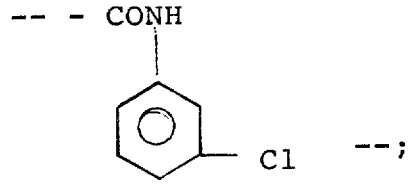

Table II, third structural formula under the heading "Chemical"; that portion of the formula reading:

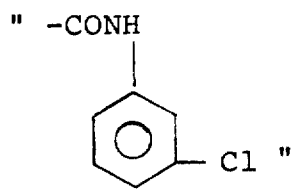   should read   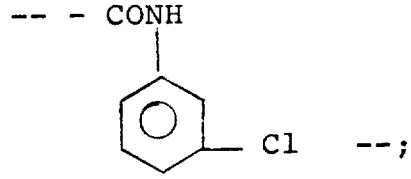

Table II, fifth structural formula under the heading "Chemical"; that portion of the formula reading:

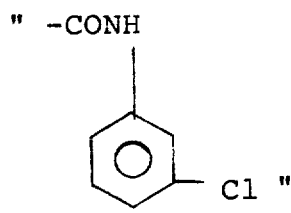   should read   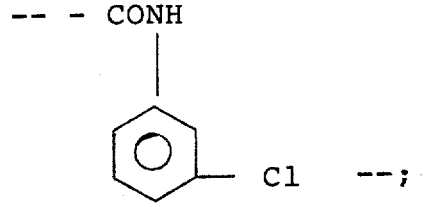

PO-1050
(5/69)

UNITED STATES PATENT OFFICE
CERTIFICATE OF CORRECTION

Patent No. 3,657,263          Dated April 18, 1972

Inventor(s) Tullo Vitali, Pietro Scrivani, Riccardo Ponci, Giovanni Pellegrini, Franco Gialdi and Emilio Arsura It is certified that error appears in the above-identified patent and that said Letters Patent are hereby corrected as shown below:

Table III, second structural formula under the heading "Chemical"; that portion of the formula reading:

" 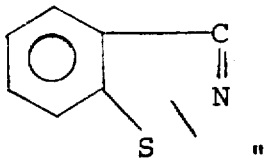  should read  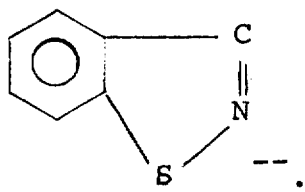 ."

Column 16, Table II, second structural formula, in the last column under the heading "Vic" insert -- 1 --; Table III, in the third structural formula, in the last column under the heading "Set", "3/ " should read -- 3/4 --; same line under the heading "Vic", "40/1" should read -- 0/1 --.

Column 17, line 56 "obtained" should read -- obtainable --.

Signed and sealed this 25th day of December 1973.

(SEAL)
Attest:

EDWARD M. FLETCHER, JR.          RENE D. TEGTMEYER
Attesting Officer                Acting Commissioner of Patents